United States Patent
Lübbing et al.

[19]

[11] Patent Number: 6,041,749
[45] Date of Patent: Mar. 28, 2000

[54] WEAR RESISTANT CYLINDER BARREL SURFACE FOR SUPPORTING A PISTON

[75] Inventors: Bernd-Eric Lübbing, Eberbach; Rüdiger Schäfer, Mutterstadt, both of Germany

[73] Assignee: DaimlerChrysler AG, Stuttgart, Germany

[21] Appl. No.: 09/250,428

[22] Filed: Feb. 16, 1999

[30] Foreign Application Priority Data

Feb. 18, 1998 [DE] Germany .................. 198 06 689

[51] Int. Cl.$^7$ ...................................................... F02F 1/20
[52] U.S. Cl. ............................................................. 123/193.2
[58] Field of Search .................. 123/193.2; 29/888.06, 29/888.061

[56] References Cited

U.S. PATENT DOCUMENTS

| | | | |
|---|---|---|---|
| 3,657,078 | 4/1972 | Schweikher | 123/193.2 |
| 3,749,072 | 7/1973 | Schweikher | 123/193.2 |
| 3,808,955 | 5/1974 | Hamada et al. | 123/193.2 |
| 4,706,417 | 11/1987 | Gary | 123/193.2 |

FOREIGN PATENT DOCUMENTS

| | | |
|---|---|---|
| 2 037 962 | 2/1971 | Germany . |
| 35 10 393 | 4/1986 | Germany . |
| 196 29 332 | 6/1997 | Germany . |

*Primary Examiner*—Marguerite McMahon
*Attorney, Agent, or Firm*—Klaus J. Bach

[57] ABSTRACT

In a cylinder with a cylinder surface receiving a piston the cylinder surface has at least two zones with different oil retention capabilities; sectors having a relatively high oil retention capability are disposed in areas of the cylinder surface which are subjected to relatively high radial pressure forces while the other areas have only a relatively low oil retention capability. The oil retention sectors have a width which changes over their axial length so as to provide only a surface area with increased oil retention capability as needed to accommodate high radial pressure forces of the piston while the rest of the cylinder surface has a low oil retention capability to eliminate unnecessary oil consumption and engine emissions.

13 Claims, 2 Drawing Sheets

WEAR RESISTANT CYLINDER BARREL SURFACE FOR SUPPORTING A PISTON

BACKGROUND OF THE INVENTION

The invention relates to a cylinder barrel with a surface for receiving a piston, particularly of an internal combustion engine including a surface structure adapted to retain a relatively large oil volume to reduce friction and wear of the surface.

DE 196 29 332 C1 discloses wear resistant cylinder surfaces which assists in reducing the friction of a piston moving in the cylinder. The cylinder surface is hardened by laser treatment whereby, during the hardening procedure, brass particles are deposited on the cylinder surface, which improves oil adherence. The oil retaining capability of the cylinder wall is increased by the brass particles so that the wear of the cylinder surfaces and of the piston is decreased and the life and operational safety of an engine having cylinder surfaces treated in this manner are improved.

In order to reduce oil consumption and also HC emissions, it is however advantageous it the volume of oil retained on the cylinder surfaces is a small as possible. But the oil retaining capability can be reduced only to a certain degree to avoid excessive wear.

DE 35 10 393 C1 discloses a cylinder surface for a piston which includes in the area of the upper dead center position of the piston, an annular zone with a lattice of points having a Ledeburit structure. The zone with the Ledeburit structure points is said to improve the wear and corrosion resistance. Between adjacent Ledeburit structure points, the cylinder surface is radially recessed providing for areas in which additional oil can be retained so as to improve the oil supply to the cylinder surfaces.

It is the object of the present invention to provide a cylinder surface with an optimal lubrication structure providing also for low oil consumption and low HC emissions.

SUMMARY OF THE INVENTION

In a cylinder with a cylinder surface receiving a piston the cylinder surface has at least two zones with different oil retention capabilities; sectors having a relatively high oil retention capability are disposed in areas of the cylinder surface which are subjected to relatively high radial pressure forces while the other areas have only a relatively low oil retention capability. The oil retention sectors have a width which changes over their axial length so as to provide only a surface area with increased oil retention capability as needed to accommodate the varying radial pressure forces of the piston while the rest of the cylinder surface has a low oil retention capability to eliminate unnecessary oil consumption and engine emissions.

With the predetermined allocation of relatively high volume oil retaining sectors only to highly loaded areas of the cylinder walls, the total oil consumption is reduced and the HC emissions are also reduced.

In the axial direction of the cylinder, the oil retaining sectors have a varying width. It has been found that the radial contact pressure of the piston resulting from the mass forces of the piston and the piston rod acting on the piston in varying directions is particularly high in certain axial and radial zones of the cylinder wall. In these zones, the cylinder surface is provided with a more highly structured surface, which has a relatively high oil retaining capability. The other areas, which are subjected only to lower loads, remain either untreated or are provided with a structure with lower oil retaining capability.

Preferably, the sector with high oil retaining capability extends only over a part of the cylinder that is over a smaller axial length than the length of the piston stroke. Several distinct sectors of increased oil retaining capability may be provided, specifically in the heavily loaded areas adjacent the upper and lower dead center positions of the piston and/or in the axial center section of the cylinder surface.

Preferably, one of the sectors extends over an angular area of less than 180° based on the cylinder axis so that this sector extends over less than half the circumference of the cylinder surface. In another advantageous embodiment, two sectors are provided on the cylinder surface which are disposed opposite each other with respect to the cylinder axis and in areas of high pressure and counter pressure forces generated by forces normal to the direction of movement of piston. Each area extends in circumferential direction over a limited angular section so that, between the sectors, there are zones with low oil storage capacity.

It may be advantageous to make the sector in the upper area adjacent the upper dead center position of the piston relatively wide and to make the sector in the axial center area or the piston stroke relatively narrow.

The angular area as well as the shape, the height and the circumferential and axial positions of the sector depend on the normal forces effective on the piston that is, respectively, on the pressure in the combustion chamber.

Preferably, there is a sector in the area of the upper dead center position of the piston which extends over the whole circumference of the cylinder surface but has an axial height determined by the piston rings of the piston when disposed in the upper dead center position.

Various embodiments arid advantages of the invention will be described below in greater detail on the basis of the accompanying drawings.

DESCRIPTION OF PREFERRED EMBODIMENTS

Figure 1:
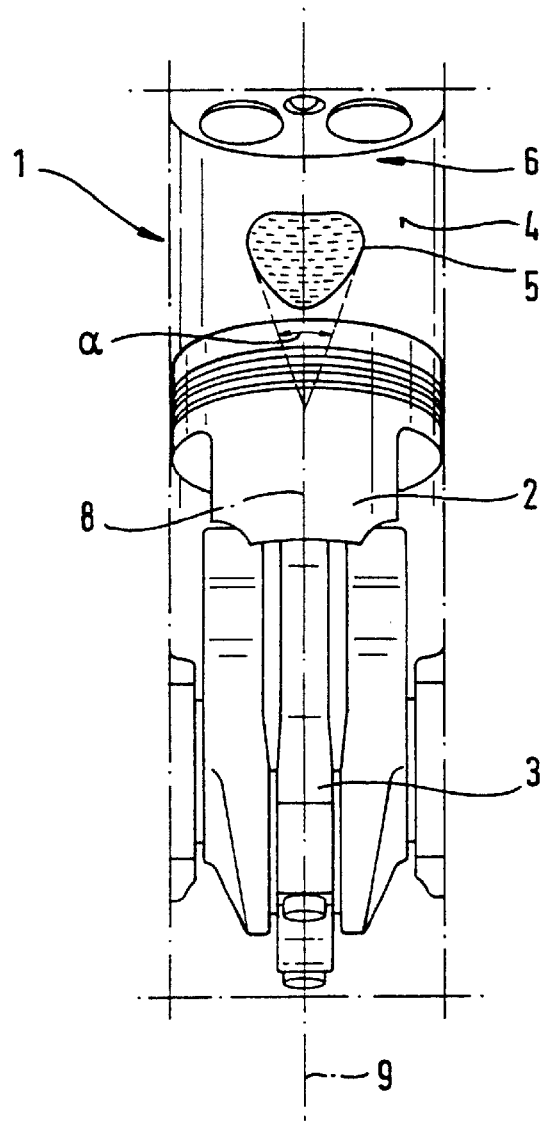
FIG. 1 is a perspective view of a cylinder including a piston, showing a sector on the cylinder wall with increased oil retaining capability.

As shown in FIG. 1, a cylinder 1 of an internal combustion engine includes an axially movable piston 2 whose movement is transmitted, by way of a connecting rod 3, to a crankshaft of the engine. In order to provide for low-friction and, consequently, low-wear movement of the piston 2 in the cylinder 1, an oil film is disposed on the cylinder surface 4. In order to reduce oil consumption and HC emissions of the engine, only predetermined areas of the cylinder surface 4, which are subjected to relatively high forces of the piston normal to the piston axis are provided with a surface structure 7, which causes increased oil retention. All other cylinder surface areas are structured so as to retain only little oil. In this way, the average need for oil retention is reduced without detrimentally affecting lubrication of the cylinder wall.

The areas of the cylinder surface provided with an oil retaining structure 7 include the sectors 5 covering areas, which are subjected to high pressure forces generated by the mass forces of the piston 2 and the connecting rod 3. These areas subjected to high radial pressure forces extend over an angular section of the cylinder surface 4, which is preferably less than 180°. Consequently, the sector 5 provided with an oil retaining structure extends over an angular range α based on the cylinder axis, which is less than 180°, specifically about 90°.

The areas subjected to high pressure forces are especially at the upper dead center position 6 of the piston and also at its lower dead center position. Accordingly, the sectors 5 are disposed in the respective areas. The location of the symmetrical sector 5 shown in FIG. 1 is selected within the circumference of the cylinder surface 4 is preferably in such a way that the plane of movement 9 of the connecting rod 3 coincides with the plane of symmetry of the sector 5.

Figure 2:
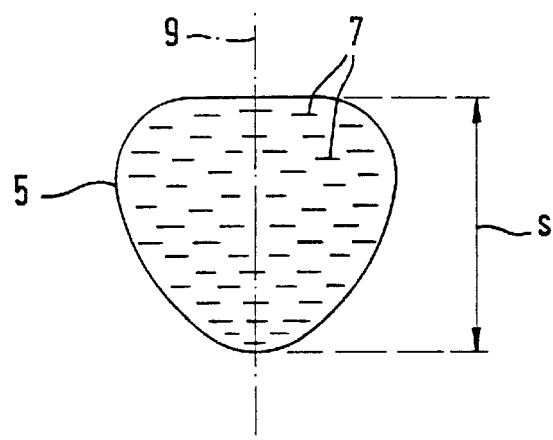
FIG. 2 is an enlarged view of the sector with increased oil retaining capability.

The axial heights of the sector 5 is less than the axial length of the cylinder 1 or, respectively, the piston stroke, but extends to the axial center area of the cylinder surface 4. The sector 5 has a width which varies over the axial height substitute of the cylinder. It is triangular or heart-shaped, so that the upper portion of the sector which is disposed adjacent the upper dead center position 6 of the piston is wider than the lower portion adjacent the lower dead center position of the piston (see FIG. 2). The varying width of the sector takes into account the forces acting on the piston in radial direction which change in size as a result of the kinematics of the crankgear, depending on the piston stroke, the connecting rod orientation and the pressure forces on the piston. Accordingly, several sectors with oil retaining structures may be provided which are arranged at different locations on the cylinder surface in radial as well as in axial respect and in shape.

The limits of the sector 5 on the cylinder surface in radial and in axial direction provide for relatively large areas of the cylinder wall 4 without oil retaining structure, that is, with a structure, which retains only small amounts of oil. As a result, oil use for cylinder lubrication is substantially reduced.

The oil receiving structure comprises a multitude of recesses disposed side-by-side and on top of one another in the cylinder surface 4. The recesses may have any geometric shape. Preferably, the recesses are in the form of pockets. The recesses can be formed into the cylinder surface with the aid of lasers, possibly in connection with honing or, alternately, by etching using a mask, by engraving or by stamping utilizing a stamp or a roller. As compared to the laser process, the alternative processes are less costly.

Figure 3:
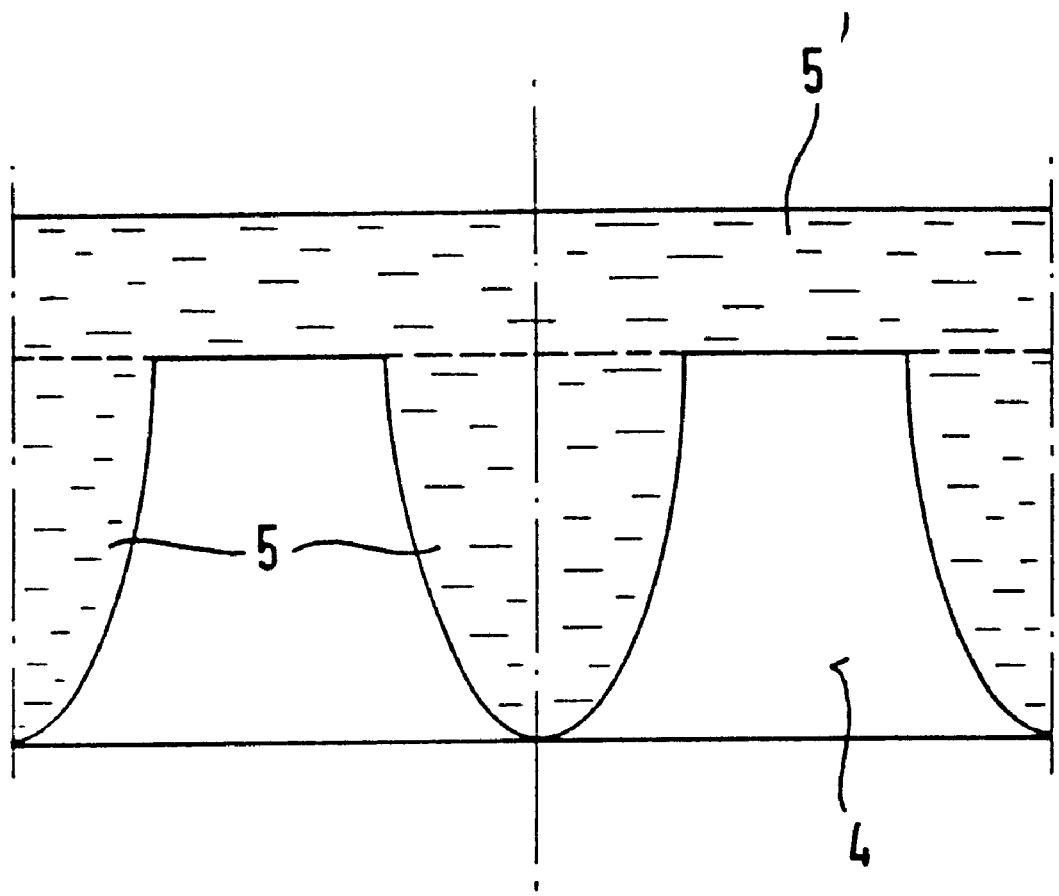
FIG. 3 shows a cylinder surface projected on a plane.

FIG. 3 shows a cylinder surface 4 projected on a plane. In order to take the pressure induced by the piston force normal to the axis of the piston into account and also the reaction pressure generated thereby, there are provided two sectors 5 with an oil retaining structures which are displaced by 180° so that they are arranged at, with respect to the cylinder axis, opposite sides of the cylinder. Between the sectors 5, which are evenly spaced from each other, there are relatively large zones 4 with little oil retention capability. The sectors 5 extend upwardly with varying width up to the area of the upper dead center position of the piston.

In the area of the upper dead center position of the piston 2, the cylinder surface 4 includes an additional sector 5' with an oil retaining structure which extends around the whole cylinder and from which the sectors 5 extend downwardly. The axial height of the circumferential sector is adjusted to the piston rings of the piston so as to accommodate the higher load caused by the piston rings when the piston is in the top dead enter position.

The cylinder surface arrangement according to the invention is also suitable for use in connection with piston compressors.

What is claimed is:

1. A cylinder with a cylinder surface for receiving a piston, of an internal combustion engine, said cylinder surface having at least two zones with different oil retention capabilities, said cylinder surface having at least one sector which is subjected to higher radial pressure forces than other areas of said cylinder surface, said surface sectors subjected to said higher radial pressure forces having a varying width over the axial extension thereof and having a higher oil retention capability than said other areas of said cylinder surface.

2. A cylinder according to claim 1, wherein the axial lengths of said sectors are smaller than the stroke of said piston.

3. A cylinder according to claim 1, wherein said sector is arranged in the area of the upper dead center position of said piston.

4. A cylinder according to claim 1, wherein said sector is arranged in the area of the lower dead center position of said piston.

5. A cylinder according to claim 1, wherein said sector extends circumferentially over an area of <180°.

6. A cylinder according to claim 1, wherein the upper portion of said sector adjacent the upper dead center position of said piston is wider than the lower end of said sector adjacent the lower dead center position of said piston.

7. A cylinder according to claim 1, wherein said sector includes local recesses formed into said cylinder surface so as to provide an oil retaining structure.

8. A cylinder according to claim 7, wherein said oil retaining structure includes a plurality of pockets.

9. A cylinder according to claim 1, wherein said sector has a mirror symmetrical shape.

10. A cylinder according to claim 9, wherein said sector is mirror symmetrical with respect to a plane which coincides with the plane of movement of a connecting rod connected between said piston and a crankshaft.

11. A cylinder according to claim 1, wherein at least two sectors with oil retaining structures are arranged on said cylinder surface in circumferentially spaced relationship.

12. A cylinder according to claim 11, wherein said two sectors are arranged opposite each other with respect to the cylinder axis.

13. A cylinder according to claim 3, wherein, in the area of said cylinder adjacent the upper dead center position of said piston, said cylinder includes an oil retaining structure extending circumferentially about the whole cylinder surface.

* * * * *